(12) United States Patent
Yan et al.

(10) Patent No.: US 12,701,447 B2
(45) Date of Patent: Aug. 4, 2026

(54) RADIO LINK FAILURE REPORT INFORMATION PROCESSING METHOD AND DEVICE

(71) Applicant: DATANG MOBILE COMMUNICATIONS EQUIPMENT CO., LTD., Beijing (CN)

(72) Inventors: Xue Yan, Beijing (CN); Nan Yan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 335 days.

(21) Appl. No.: 18/560,098

(22) PCT Filed: May 9, 2022

(86) PCT No.: PCT/CN2022/091777
§ 371 (c)(1),
(2) Date: Nov. 10, 2023

(87) PCT Pub. No.: WO2022/237734
PCT Pub. Date: Nov. 17, 2022

(65) Prior Publication Data
US 2024/0244462 A1 Jul. 18, 2024

(30) Foreign Application Priority Data

May 11, 2021 (CN) .......................... 202110512607.8

(51) Int. Cl.
*H04W 24/08* (2009.01)
*H04W 24/10* (2009.01)
(Continued)

(52) U.S. Cl.
CPC ........... *H04W 24/08* (2013.01); *H04W 24/10* (2013.01); *H04W 76/19* (2018.02); *H04W 36/0085* (2018.08)

(58) Field of Classification Search
CPC . H04W 24/08; H04W 36/0085; H04W 76/19; H04W 24/10
See application file for complete search history.

(56) References Cited

U.S. PATENT DOCUMENTS

2018/0278357 A1 9/2018 Kim et al.
2020/0022202 A1* 1/2020 Guha .................... H04W 76/16
(Continued)

FOREIGN PATENT DOCUMENTS

CN 107690162 A 2/2018
CN 110121187 A 8/2019
(Continued)

OTHER PUBLICATIONS

MediaTek, "Correction on RLF Report Content Handover from NR to LTE Failure", 3GPP TSG-RAN2 113e, R2-2100427, Online Meeting, Jan. 25-Feb. 5, 2021, 4 pages. (Year: 2021).*
(Continued)

*Primary Examiner* — Michael A Keller
*Assistant Examiner* — Chhian (Amy) Ling
(74) *Attorney, Agent, or Firm* — KILPATRICK TOWNSEND & STOCKTON LLP

(57) ABSTRACT

Embodiments of the present disclosure provide an information processing method and apparatus, for perfecting an RLF report to assist a network device in determining a cause of an RLF more accurately, and determining an optimization scheme. The method includes when detecting that a radio link failure (RLF) occurs in a master cell group (MCG) and/or a secondary cell group (SCG), storing an RLF report, the RLF report including first information used for instruct-
(Continued)

ing the MCG to generate the RLF, and/or second information used for instructing the SCG to generate the RLF; and when a preset condition is satisfied, reporting the RLF report to a network device.

18 Claims, 3 Drawing Sheets

(51) Int. Cl.
    *H04W 76/19*         (2018.01)
    *H04W 36/00*         (2009.01)

(56)            References Cited

U.S. PATENT DOCUMENTS

| | | | |
|---|---|---|---|
| 2020/0045764 A1 | 2/2020 | Kim et al. | |
| 2021/0337616 A1* | 10/2021 | Zhang | H04W 36/305 |
| 2021/0385897 A1* | 12/2021 | Purkayastha | H04W 36/087 |
| 2022/0053587 A1* | 2/2022 | Geng | H04W 76/19 |
| 2023/0086398 A1* | 3/2023 | Teyeb | H04W 76/19 |
| 2024/0137830 A1* | 4/2024 | Parichehrehteroujeni | H04W 36/305 |

FOREIGN PATENT DOCUMENTS

| | | |
|---|---|---|
| CN | 110913428 A | 3/2020 |
| CN | 111107593 A | 5/2020 |
| CN | 111602462 A | 8/2020 |
| CN | 111757362 A | 10/2020 |
| DE | 102020201797 A1 | 8/2020 |
| IN | 201617021776 A | 8/2016 |
| WO | 2020052550 A1 | 3/2020 |
| WO | 2020113367 A1 | 6/2020 |
| WO | 2020114371 A1 | 6/2020 |
| WO | 2020221179 A1 | 11/2020 |

OTHER PUBLICATIONS

Qualcomm Incorporated, "SON aspects of DAPS HO and Fast MCG Recovery Optimizations", 3GPP TSG-RAN WG2 Meeting #112-e, Electronic, Nov. 2-13, 2020, total 3 pages, R2-2009396.

Catt, "Introduction of CPA and Inter-SN CPC for 37 340", 3GPP TSG-RAN WG2 Meeting #113 electronic, Onlie, Jan. 25-Feb. 5, 2021, total 21 pages, R2-2101237.

Huawei,"(TP for SON BLCR for 38.423) MRO for SN Change Failure", 3GPP TSG-RAN WG3 Meeting #111-e, E-meeting, Jan. 25-Feb. 5, 2021, total 7 pages, R3-210395.

Ericsson, "Summary of AI 8.13.2", 3GPP TSG-RAN WG2 #113-e, Electronic meeting, Jan. 25-Feb. 5, 2021, total 54 pages, R2-2102265.

European Patent Office, Extended European Search Report Issued in Application No. 22806697.3, Oct. 7, 2024, Germany, 10 pages.

State Intellectual Property Office of the People's Republic of China, First Office Action and Search Report Issued in Application No. 202110512607.8, Aug. 22, 2024, 15 pages.

Notice of Allowance of Corresponding CN Patent Application No. 202110512607.8 Dated Feb. 19, 2025.

\* cited by examiner

RADIO LINK FAILURE REPORT INFORMATION PROCESSING METHOD AND DEVICE

CROSS REFERENCES TO RELATED APPLICATIONS

The present disclosure is a National Stage of International Application No. PCT/CN2022/091777, filed on May 9, 2022, which claims priority to Chinese Patent Application No. 202110512607.8, entitled "Information Processing Method and Apparatus", and filed to the China National Intellectual Property Administration on May 11, 2021, the entire contents of which are incorporated herein by reference.

FIELD

The present disclosure relates to the field of mobile communications, in particular to an information processing method and apparatus.

BACKGROUND

Currently, in a Multi-Radio Dual Connectivity, MR-DC, scenario, a User Equipment, UE, can simultaneously perform data interaction with a Master Cell Group, MCG, and a Secondary Cell Group, SCG. When a Radio Link Failure, RLF, occurs in MCG, the UE records the relevant information of a Primary Cell, PCell, (such as a PCell ID (Identification)), and cause of failure (such as the cause of T310 timer expired, etc.) in the RLF report.

However, in a Dual Connectivity, DC, scenario, whether the RLF occurs on the MCG or the SCG, for the network side device, the network device can only determine the cause of the failure in the PCell and the PCell related failure information according to the current recorded RLF report, but cannot determine the specific cause for the failure on the MCG and/or SCG side in the DC scenario, for example, what caused the fast MCG failure recovery or the failure of the SCG side, etc. As a result, the network side device cannot accurately determine the cause of the failure, to affect the network optimization performance of the network side device based on the RLF report.

SUMMARY

Embodiments of the present disclosure provide an information processing method and apparatus, which are configured to improve the RLF report, to assist the network device to more accurately determine the cause of the disconnection failure and determine an optimization plan.

In one embodiment, an information processing method is provided, which is applied to a UE, including:

storing a Radio Link Failure, RLF, report in a case that an RLF is detected in a Master Cell Group, MCG, and/or a Secondary Cell Group, SCG, where the RLF report includes: a first information used for indicating that the RLF occurs in the MCG; and/or, a second information used for indicating that the RLF occurs in the SCG;

reporting the RLF report to a network device in a case that a preset condition is met.

In some embodiments, in a case that the RLF is detected in the MCG and the SCG transmits data normally, the first information includes at least one of following:

a related information of a failure in the MCG;
a related information of T316 timer;

a Dual Connectivity, DC, indication; or
a measurement result configured by a Secondary Node, SN.

In some embodiments, in a case that the RLF is detected in the SCG and the MCG transmits data normally, the second information includes at least one of following:

a related information of a failure in the SCG;
a DC indication; or a measurement result configured by a Master Node, MN.

In some embodiments, in a case that the RLFs are detected in both the MCG and the SCG, the first information includes at least one of: a DC indication information, a related information of T316 timer, a RLF report related a failure in the MCG, or a related information of a failure in the MCG;

the second information includes at least one of: a RLF report related a failure in the SCG, or related information of a failure in the SCG;

the RLF report further includes: a time indication information used for indicating a sequence of the RLFs occur in the MCG and the SCG.

In some embodiments, the related information of a failure in the SCG includes at least one of following:

a failure type of the SCG;
a measurement result configured by the SN;
a Random Access Channel, RACH, related information of the SCG;

cell IDs of the Primary and Secondary Cell, PSCell, where the RLF occurs;

cell IDs of source PSCell and target PSCell in response to the PSCell handover failure;

a time from a moment of PSCell handover initialization/handover implementation to a moment of a failure occurs;

a time from a moment of a failure of the PSCell occurring to a moment of the RLF report being reported;

a time from a moment of a failure of the PSCell occurring to a moment of re-entering a connected state; or an indication information that the SCG is performing PSCell handover or PSCell addition.

In some embodiments, the related information of a failure in the MCG includes at least one of following:

a failure type of the MCG;
a measurement result configured by the MN;
a Random Access Channel, RACH, related information of the MCG;

a cell ID of the Primary Cell, PCell, where a RLF occurs;

cell IDs of source PCell and target PCell when the PCell handover failure;

a time from a moment of PCell handover initialization/handover implementation to a moment of a failure occurs;

a time from a moment of a failure of the PCell occurring to a moment of the RLF report being reported;

a time from a moment of a failure of the PCell occurring to a moment of re-entering a connected state; or an indication information that the MCG is performing PCell handover.

In some embodiments, the time indication information includes:

a first identifier used for indicating that the RLF occurring in the MCG is earlier than the RLF occurring in the SCG or indicating that the RLF occurring in the SCG is earlier than the RLF occurring in the MCG; or, a first time difference; or, an absolute time or a relative time at which the RLF occurs in the MCG, and an absolute time or a relative time at which the RLF occurs in the SCG.

In some embodiments, the related information of T316 timer includes at least one of following:

a bit value explicitly indicating whether the T316 timer is configured;

a configured running duration of the T316 timer;

an already-running time of the T316 timer; or a second identifier explicitly indicating whether the T316 timer has expired.

In one embodiment, an information processing method is provided, which is applied to a network device, including:

receiving an RLF report transmitted by a UE, where the RLF report includes: a first information used for indicating that a RLF occurs in an MCG; and/or a second information used for indicating that a RLF occurs in a SCG; and performing a network optimization according to the RLF report.

In some embodiments, the performing the network optimization according to the RLF report includes:

transmitting the RLF report to a source MN and a source SN according to a source PCell ID and a source PSCell ID, where the source MN includes the MCG, and the source SN includes the SCG; or, transmitting the RLF report to a source MN according to a source PCell ID, or transmitting the RLF report and first indication information to a source MN according to a source PCell ID, where the first indication information is used for indicating the source MN to transmit the RLF report to the source SN according to cell IDs of source PSCell.

In one embodiment, an information processing device is provided, which is applied to a UE, including:

a processing device configured to store a Radio Link Failure, RLF, report in a case that an RLF is detected in a Master Cell Group, MCG, and/or a Secondary Cell Group, SCG, where the RLF report includes: a first information used for indicating that the RLF occurs in the MCG; and/or, a second information used for indicating that the RLF occurs in the SCG;

a communication device configured to report the RLF report to a network device in a case that a preset condition is met.

In some embodiments, in a case that the RLF is detected in the MCG and the SCG transmits data normally, the first information includes at least one or more of following:

a related information of a failure in the MCG;

a related information of T316 timer;

a Dual Connectivity, DC, indication; or a measurement result configured by a Secondary Node, SN.

In some embodiments, in a case that the RLF is detected in the SCG and the MCG transmits data normally, the second information includes at least one or more of following:

a related information of a failure in the SCG;

a DC indication; or a measurement result configured by a Master Node, MN.

In some embodiments, in a case that the RLFs are detected in both the MCG and the SCG, the first information includes at least one or more of: a DC indication information, a related information of T316 timer, a RLF report related a failure in the MCG, or a related information of a failure in the MCG;

the second information includes at least one or more of: a RLF report related a failure in the SCG, or related information of a failure in the SCG;

the RLF report further includes: a time indication information used for indicating a sequence of the RLFs occur in the MCG and the SCG.

In some embodiments, the related information of a failure in the SCG includes at least one or more of following:

a failure type of the SCG;

a measurement result configured by the SN;

a Random Access Channel, RACH, related information of the SCG;

cell IDs of the Primary and Secondary Cell, PSCell, where the RLF occurs;

cell IDs of source PSCell and target PSCell in response to the PSCell handover failure;

a time from a moment of PSCell handover initialization/handover implementation to a moment of a failure occurs;

a time from a moment of a failure of the PSCell occurring to a moment of the RLF report being reported;

a time from a moment of a failure of the PSCell occurring to a moment of re-entering a connected state; or an indication information that the SCG is performing PSCell handover or PSCell addition.

In some embodiments, the related information of a failure in the MCG includes at least one or more of following:

a failure type of the MCG;

a measurement result configured by the MN;

a Random Access Channel, RACH, related information of the MCG;

a cell ID of the Primary Cell, PCell, where a RLF occurs;

cell IDs of source PCell and target PCell when the PCell handover failure;

a time from a moment of PCell handover initialization/handover implementation to a failure occurs;

a time from a moment of a failure of the PCell occurring to a moment of the RLF report being reported;

a time from a moment of a failure of the PCell occurring to a moment of re-entering a connected state; or an indication information that the MCG is performing PCell handover.

In some embodiments, the time indication information includes:

a first identifier used for indicating that the RLF occurring in the MCG is earlier than the RLF occurring in the SCG or indicating that the RLF occurring in the SCG is earlier than the RLF occurring in the MCG; or, a first time difference; or, an absolute time or a relative time at which the RLF occurs in the MCG, and an absolute time or a relative time at which the RLF occurs in the SCG.

In some embodiments, the related information of T316 timer includes at least one or more of following:

A bit value explicitly indicating whether the T316 timer is configured;

a configured running duration of the T316 timer;

an already-running time of the T316 timer; or a second identifier explicitly indicating whether the T316 timer has expired.

In one embodiment, an information processing device is provided, which is applied to network device, including:

a receiving device configured to receive an RLF report transmitted by a UE, where the RLF report includes: a first information used for indicating that a RLF occurs in an MCG; and/or a second information used for indicating that a RLF occurs in a SCG; and a processing device configured to perform a network optimization according to the RLF report.

In some embodiments, the communication device is configured to:

transmit the RLF report to a source MN and a source SN according to a source PCell ID and a source PSCell ID, where the source MN includes the MCG, and the source SN includes the SCG; or, transmit the RLF report to a source MN according to a source PCell ID, or transmit the RLF report and first indication information to a source MN according to a source PCell ID, where the first indication information is used for indicating the source MN to transmit the RLF report to the source SN according to cell IDs of source PSCell.

In one embodiment, an information processing device is provided, which includes:

a memory configured to store program instructions;

a processor configured to invoke the program instructions stored in the memory, and implement followings according to obtained program instructions:

storing a Radio Link Failure, RLF, report in a case that an RLF is detected in a Master Cell Group, MCG, and/or a Secondary Cell Group, SCG, where the RLF report includes: a first information used for indicating that the RLF occurs in the MCG; and/or, a second information used for indicating that the RLF occurs in the SCG;

reporting the RLF report to a network device in a case that a preset condition is met.

In some embodiments, in a case that the RLF is detected in the MCG and the SCG transmits data normally, the first information includes at least one of following:

a related information of a failure in the MCG;

a related information of T316 timer;

a Dual Connectivity, DC, indication; or a measurement result configured by a Secondary Node, SN.

In some embodiments, in a case that the RLF is detected in the SCG and the MCG transmits data normally, the second information includes at least one of following:

a related information of a failure in the SCG;

a DC indication; or a measurement result configured by a Master Node, MN.

In some embodiments, in a case that the RLFs are detected in both the MCG and the SCG, the first information includes at least one or more of: a DC indication information, a related information of T316 timer, a RLF report related a failure in the MCG, or a related information of a failure in the MCG;

the second information includes at least one or more of: a RLF report related a failure in the SCG, or a related information of a failure in the SCG;

the RLF report further includes: a time indication information used for indicating a sequence of the RLFs occur in the MCG and the SCG.

In some embodiments, the related information of a failure in the SCG includes at least one of following:

a failure type of the SCG;

a measurement result configured by the SN;

a Random Access Channel, RACH, related information of the SCG;

cell IDs of the Primary and Secondary Cell, PSCell, where the RLF occurs;

cell IDs of source PSCell and target PSCell in response to the PSCell handover failure;

a time from a moment of PSCell handover initialization/handover implementation to a moment of a failure occurring;

a time from a moment of a failure of the PSCell occurring to a moment of the RLF report being reported;

a time from a moment of a failure of the PSCell occurring to a moment of re-entering a connected state; or an indication information that the SCG is performing PSCell handover or PSCell addition.

In some embodiments, the related information of a failure in the MCG includes at least one of following:

a failure type of the MCG;

a measurement result configured by the MN;

a Random Access Channel, RACH, related information of the MCG;

a cell ID of the Primary Cell, PCell, where a RLF occurs;

cell IDs of source PCell and target PCell in response to the PCell handover failure;

a time from a moment of PCell handover initialization/handover implementation to a moment of a failure occurring;

a time from a moment of a failure of the PCell occurring to a moment of the RLF report being reported;

a time from a moment of a failure of the PCell occurring to a moment of re-entering a connected state; or an indication information that the MCG is performing PCell handover.

In some embodiments, the time indication information includes:

a first identifier, used for indicating that the RLF occurring in the MCG is earlier than the RLF occurring in the SCG or indicating that the RLF occurring in the SCG is earlier than the RLF occurring in the MCG; or, a first time difference; or, an absolute time or a relative time at which the RLF occurs in the MCG, and an absolute time or a relative time at which the RLF occurs in the SCG.

In some embodiments, the related information of T316 timer includes at least one or more of following:

a bit value explicitly indicating whether the T316 timer is configured;

a configured running duration of the T316 timer;

an already-running time of the T316 timer; or a second identifier explicitly indicating whether the T316 timer has expired.

In one embodiment, an information processing device is provided, the device including:

a memory configured to store program instructions;

a processor configured to invoke the program instructions stored in the memory, and implement followings according to obtained program instructions:

receiving an RLF report transmitted by a UE, where the RLF report includes: a first information used for indicating that a RLF occurs in an MCG; and/or a second information used for indicating that a RLF occurs in a SCG;

performing a network optimization according to the RLF report.

In some embodiments, the performing network optimization according to the RLF report includes:

transmitting the RLF report to a source MN and a source SN according to a source PCell ID and a source PSCell ID, where the source MN includes the MCG, and the source SN includes the SCG; or, transmitting the RLF report to a source MN according to a source PCell ID, or transmitting the RLF report and first indication information to a source MN according to a source PCell ID, where the first indication information is used for indicating the source MN to transmit the RLF report to the source SN according to cell IDs of source PSCell.

In one embodiment, a computer-readable storage medium is provided, the computer-readable storage medium stores computer-executable instructions, and the computer-executable instructions are configured to make a computer execute any one of the steps in embodiments of the disclosure.

In embodiments of the present disclosure, when the UE detects that RLF occurs in the MCG and/or the SCG, the first information used for indicating that RLF occurs in the MCG, and/or the second information used for indicating that RLF occurs in the SCG are recorded in the RLF report. And, the RLF report is reported to the network device when the preset condition is met. That is, the content recorded in the RLF report in this disclosure may include not only related information of RLF occurring in the MCG, but also related information of RLF occurring in the SCG. The content recorded in the RLF report is more complete than that in the existing RLF report. In this way, the network device can be assisted to more accurately determine the failure cause and determine an optimization solution.

BRIEF DESCRIPTION OF FIGURES

In order to more clearly illustrate embodiments of the present disclosure, the accompanying figures required in the description of the embodiments will be briefly introduced below. The accompanying figures in the following description are only some embodiments of the present disclosure.

DETAILED DESCRIPTION

Figure 1:
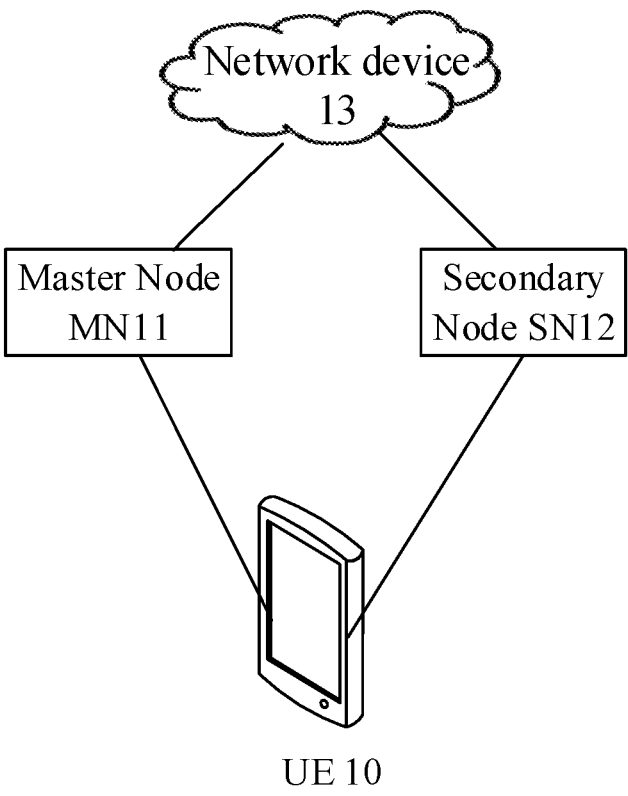
FIG. 1 is a schematic diagram of an application scenario provided by an embodiment of the present disclosure.

In order to make the embodiments of the present disclosure clearer, the embodiments of the present disclosure will be further illustrated below in details with reference to the accompanying figures. The described embodiments are merely a part of the embodiments of the present disclosure but not all the embodiments. In the case of no conflict, the embodiments in the present disclosure and the features in the embodiments can be combined arbitrarily with each other. Also, although a logical order is shown in the flowcharts, in some cases the steps shown or described may be performed in an order different from that shown or described herein.

The terms "first" and "second" in the specification and claims of the present disclosure and the above drawings are used to distinguish different objects, rather than to describe a specific order. Furthermore, the term "comprises", as well as any variations thereof, is intended to cover non-exclusive protections. For example, a process, method, system, product or device including a series of steps or units is not limited to the listed steps or units, but may also include unlisted steps or units, or may further includes other steps or units inherent in these processes, methods, products or apparatuses. "Multiple" in the present disclosure may mean at least two, for example, may be two, three or more, which is not limited in the embodiments of the present disclosure.

In addition, the term "and/or" in the present disclosure is only an association relationship describing associated objects, which means that there may be three relationships, for example, A and/or B, which may represent three relationships: A exists alone, A and B exist at the same time, or B exists alone. In addition, the character "/" in the present disclosure, unless otherwise specified, generally indicates that the contextual objects are an "or" relationship.

For ease of understanding, the following first introduces the background of embodiments of the present disclosure.

In the MR-DC architecture, there may be one MN (Master Node) and one or more SNs (Secondary Nodes). Both the MN node and SN nodes may be LTE/e-LTE/NR nodes. The cell group on the MN side is the Master Cell Group (MCG), which consists of a primary cell (PCell) and one or more Secondary Cells (SCells); the cell group on the SN side is the Secondary Cell Group (SCG), which also consists of a Primary Secondary Cell (PSCell) and one or more secondary cells. UE can perform data interaction with MCG and SCG at the same time. When the network decides to add/replace an SN node for the UE or modifies the SCG radio resource configuration for the SN node, it can use the Radio Resource Control (RRC) reconfiguration message to complete. If the resource of the SN node needs to be used, a random access procedure for the SN node needs to be initiated.

In the MR-DC architecture, there are several processes as follow.

1. MCG Failure Recovery Process

In MR-DC, a UE can perform data interaction with the MCG and SCG at the same time. When the RLF only occurs in the MCG causing the connection to be disconnected, the UE can turn on the T316 timer and report the MCG Failure Information message to the network. The MCG Failure Information message includes the type of failure and relevant measurement result information, and is used to inform the network that the MCG connection is disconnected and waiting for the network decision. Currently, the UE transmits the MCG Failure Information message to the network only in the case of that the radio link failure (RLF) occurs.

The MCG Failure Information message is transmitted by the UE to the network through the SN side. After receiving the MCG Failure Information message, the network can decide to transmit an RRC reconfiguration message, an RRC release message, or mobilityFromNRCommand (movement from NR instruction) or mobilityFromEutraCommand (movement from Eutra instruction) supporting inter-rat (intersystem) handover according to failure reasons and measurement results reported by the UE. When the UE receives the RRC reconfiguration message or the mobility FromNR-Command, mobility FromEutraCommand message, the UE will turn off the T316 timer, turn on the T304 timer and perform the PCell handover process. When the PCell handover is successful, turn off the T304 timer, and the MCG of the UE resumes the connection and transmits the completion message to the network. When the PCell handover fails, the UE will initiate a re-establishment process after T304 expired. When receiving the RRC release message transmitted by the network device, the UE will return to the idle/inactivate state. After receiving the above message, the UE will delete the stored RLF Report.

When the RLF occurs in the MCG side causing the connection disconnected, there may also be the following cases: (1) The network device does not configure T316 timer for the UE; (2) the SCG side is in a suspended state at this time; (3) the SCG can transmit normally, turn on T316 timer, transmit MCG Failure Information message, RLF occurs in SCG before receiving the RRC feedback message transmitted by the network; (4) SCG can transmit normally, turn on T316 timer, transmit MCG Failure Information message, before receiving the RRC feedback message transmitted by the network T316 expired.

In the above cases, the UE will store the RLF Report and initiates a reestablishment process. The UE will transmit the RLF report available instruction in the uplink completion message, and the UE will report the RLF report to the network when the UE receives the request transmitted by network. The network analyzes the causes for the RLF and performs optimization.

2. SCG Failure Recovery Process

In MR-DC, a UE can perform data interaction with MCG and SCG at the same time.

When the RLF occurs in the SCG, synchronous reconfiguration fails, SCG configuration fails, or SCG integrity verification fails, resulting the connection disconnected, the UE reports an SCG Failure Information message to the network. The SCG Failure Information message includes the failure type and related measurement result information, and is configured to inform the network that the SCG connection is disconnected, and waits for a network decision. Currently, the UE transmits the SCG Failure Information message to the network only in the case of that the radio link failure, synchronous reconfiguration failure, SCG configuration failure, or SCG integrity verification failure occurs.

The SCG Failure Information message is transmitted by the UE to the network through the MN side. After receiving the SCG Failure Information message, the network can decide to transmit an RRC reconfiguration message, RRC release message to the UE according to failure reasons and measurement results reported by the UE. When the UE receives the RRC reconfiguration message, the UE will turn on the T304 timer, and perform the Primary Secondary Cell, PSCell, handover process. When the PSCell handover is successful, turn off the T304 timer, and the SCG of the UE resumes the connection and transmits the completion message to the network. When the PSCell handover fails, the UE will continue to transmit SCG Failure Information to the network device until the network device suspends/releases the SCG or successfully restores the SCG connection.

When the RLF occurs in the SCG side causing the connection disconnected, UE re-establishment will be triggered in the following two cases: (1) the MCG side is in a suspended state; (2) MCG can transmit normally, the SCG Failure Information message is transmitted, and the RLF occurs in the MCG before the RRC feedback message transmitted by the network.

3. Failure Occurred in Both MCG and SCG

When the MCG side failed and the MCG Failure Information was transmitted through the SCG side, it was found that the SCG side also failed; or when the MCG Failure Information message has been transmitted but the RRC feedback message transmitted by the network has not been received, the SCG side also fails; or when the SCG side failed and the SCG Failure Information was transmitted through the MCG side, it is found that the MCG side also failed; or when the SCG Failure Information message has been transmitted but the RRC feedback message transmitted by the network has not been received, the MCG side also fails; at this time, the UE will initiate the RRC re-establishment process to restore the connection.

It can be seen that in the MR-DC architecture, the network situation that causes the failure of the MCG and the failure of the SCG is relatively complicated. According to the existing method, the UE will only generate an RLF report when the RLF occurs in the MCG, and the RLF report only includes the cause for the failure of the PCell and the relevant information of the PCell, which will be very unfavorable for the network analysis the cause of failure of the MCG and the cause of failure of the SCG, resulting in poor network optimization performance.

For example, when the RLF occurs in MCG, if the T316 timer is configured and the SCG can transmit normally, the T316 timer can be turn on, and the MCG failure information message can be transmitted to the network device through the SCG; or when the RLF occurs in the SCG, the SCG failure information message can be transmitted to the network through the MCG. Fast recovery or release is performed according to the RRC feedback information transmitted by the network device.

However, in a dual-connection scenario, when the RLF occurs in the MCG, the UE can also transmit an MCG failure information message to the network device through the SCG, and the network device can change the configuration parameters or instruct the network device to release the MCG, and transmit the final decision information to the UE through the RRC feedback message, and the UE updates the configuration parameters based on the RRC feedback message for quick recovery, or releases the MCG. If the recovery is successful or the MCG is successfully released, the RLF report will be deleted. If the recovery fails, after entering the connection state again, instructions stored with the RLF report will be reported to the UE in the uplink completion information; and when the network device transmits a request for the UE to report the RLF report, the UE transmits the RLF report to the network device. Therefore, the cause for the radio link failure may be the RLF also occurred in SCG. Therefore, in a dual connection scenario, the current RLF report reported by the UE is not perfect enough, and the network device cannot accurately determine the cause of the failure based on the current RLF report.

In order to make the RLF report reported by the UE more perfect in the dual connection scenario, the present disclosure provides an information processing method. In the present disclosure, when the UE detects that RLF occurs in the MCG and/or the SCG, the stored RLF report includes not only related information of RLF occurring in the MCG, but also related information of RLF occurring in the SCG. The content recorded in the RLF report is more complete, and the network device can be assisted to more accurately determine the failure cause and determine an optimization solution.

After introducing the design ideas of embodiments of the present disclosure, the following briefly introduces the applicable application scenarios of the embodiments of the present disclosure. It should be noted that the application scenarios introduced below are only used to illustrate the embodiments of the present disclosure and unlimited. During specific implementation, the embodiments of the present disclosure may be flexibly applied according to actual needs.

Please refer to FIG. 1, FIG. 1 is a schematic diagram of an application scenario provided by an embodiment of the present disclosure.

In this application scenario, a Master Node (MN) 11, at least one Secondary Node (SN) 12, a network device 13 and a UE 10 are included. Both the MN node 11 and the SN node 12 can be LTE/e-LTE/NR nodes; the cell group on the MN side is an MCG, which includes one PCell and at least one Secondary Cell (SCell); and the cell group on the SN side is an SCG, which includes a Primary Secondary Cell (PSCell) and at least one SCell. The UE 10 can perform data interaction with the MCG and the SCG at the same time. The network device 13 can add/replace the SN node for the UE 10 through the RRC configuration message, and modify the radio resource configuration for the MN node and the SN node. When the UE 10 needs to use the SN node, it can initiate a random access according to the RRC configuration information transmitted by the network device 13. The UE 10 may be a mobile phone, a tablet computer, a notebook computer, an Ultra-Mobile Personal Computer (UMPC), a netbook, or Personal Digital Assistant (PDA) etc. The network device 13 may be a base station, and the base station may be a commonly used base station, or an evolved Node Base station (eNB), or a network side device in a 5G system (such as a next generation Node Base station, gNB) and other equipments.

In some embodiment of the present disclosure, the UE 10 detects whether the RLF occurs in the MCG and/or SCG, stores the RLF report when determining that RLF occurs, and transmits the generated report to the network device 13 when a preset condition is met.

The embodiments of the present disclosure are described below in conjunction with the accompanying drawings of the description.

Figure 2:
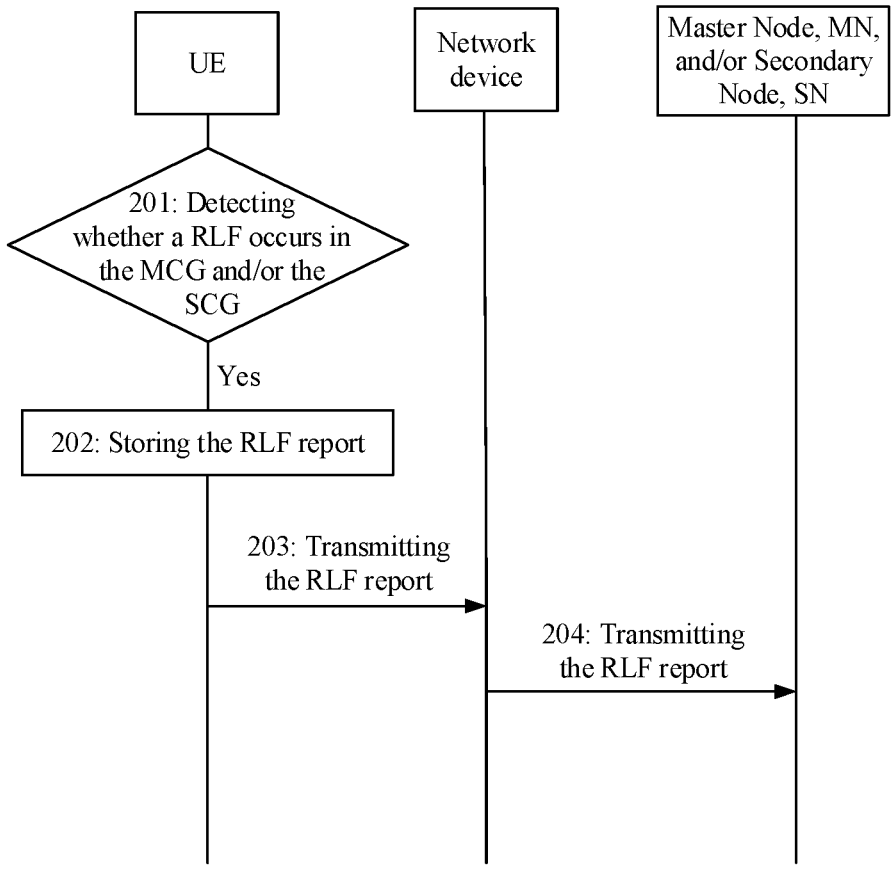
FIG. 2 is a flow interaction diagram of an information processing method provided by an embodiment of the present disclosure.

Please refer to FIG. 2, which is a flow interaction diagram of an information processing method provided by an embodiment of the present disclosure. The flow diagram of an information processing method described in FIG. 2 is as follows:

Step 201: the UE detects whether a RLF occurs in the MCG and/or the SCG; and

Step 202: when the UE detects that the RLF occurs in the MCG and/or the SCG, the UE stores the RLF report.

In some embodiments of the present disclosure, the RLF report includes the first information used for indicating that the RLF occurs in the MCG; and/or, the second information used for indicating that the RLF occurs in the SCG. When the detection results are different, the contents recorded in the RLF report may be different.

In some embodiments, the detection results include: the RLF occurs in the MCG and the SCG transmits data normally; the RLF occurs in the SCG and the MCG transmits data normally; or the RLFs occur in both the MCG and the SCG. The occurrence of RLF in MCG and SCG includes two cases: the RLF in MCG is detected first, then the RLF in SCG is detected; and the RLF in SCG is detected first, and then the RLF in MCG is detected. The contents of the first information and/or second information in the RLF report corresponding to each case are as follow.

1. When the detection result is that the RLF occurs in the MCG and the SCG can transmit data normally, the RLF report only includes the first information used for indicating that the RLF occurs in the MCG. At this time, the first information includes at least one or more of: related information of a failure in the MCG side (for example: a failure type of MCG, a measurement result configured by the MN, etc.), related information of T316 timer, DC indication, or a measurement result of configured by the SN. The failure type may be, for example, the occurrence of RLF or handover failure.

That is, for this situation, compared with the prior art solution, the first information included in the RLF report is also supplemented, the supplemented information includes, such as, related information of T316 timer, DC indication and the measurement result configured by the SN etc., and the network device can more accurately determine the cause of RLF in the MCG based on the content of the RLF report, and then perform more targeted optimization on the network.

2. When the detection result is that the RLF occurs in the SCG and the MCG can transmit data normally, the RLF report only includes the second information used for indicating that the RLF occurs in the SCG. At this time, the second information includes at least one of: related information of a failure in the SCG side (for example: a failure type of the SN, a measurement result configured by SN, etc.), DC indication, or a measurement result configured by the MN.

3. When the detection result is that the RLF occurs in both MCG and SCG, the RLF report includes: DC indication information, related information of T316 timer, the RLF report related to MCG side failure, related information of failures in MCG side, and RLF reports related to SCG side failure, related information of failures in the SCG side, and time indication information used for indicating the sequence of the RLFs occurred in the MCG and the SCG, etc. It should be noted that the information included in the RLF may also be divided into the first information used for indicating that RLF occurs in MCG, the second information used for indicating that RLF occurs in SCG, and other information. The first information includes at least one of: DC indication information, related information of T316 timer, a RLF report related to MCG side failure, or related information of failure in the MCG side. The second information includes at least one of: a RLF report related to SCG side failure, or related information of failure in SCG side. Other information may refer to time indication information used for indicating the sequence of the RLFs occurred in the MCG and the SCG, etc.

That is, when the detection result is that the RLFs occur in both the MCG and the SCG, the transmitted RLF report may also include two RLF sub-reports, that is, the RLF report related to the failure in the MCG side and the RLF report related to the failure in the SCG side.

It should be noted that the RLF report related to the failure in the MCG side can be understood as a report generated by recording relevant content when RLF occurs in MCG. The RLF report related to failure in the SCG side can be understood as a report generated by recording relevant content when RLF occurs in SCG.

Here, the related information of the failure in the SCG side includes at least one of: a failure type of the SCG; a measurement result configured by the SN; Random Access Channel, RACH, related information of the SCG; cell IDs of the Primary and Secondary Cell, PSCell, where the RLF occurs; cell IDs of source PSCell and target PSCell when the PSCell handover failure; time from PSCell handover initialization to a failure occurs; time from when a failure of the PSCell occurs to when the RLF report is reported; time from when a failure of the PSCell occurs to re-entering a connected state; or indication information that the SCG is performing PSCell handover or PSCell addition. If the related information of the failure in the SCG side in the RLF report includes the indication information that the SCG is performing PSCell handover or PSCell addition, it indicates that the RLF has occurred in the MCG at this time, and SCG is undergoing PSCell addition or PSCell handover processes, and data transmission cannot proceed normally. It should be noted that the related information of the PSCell listed above is only a part, and other similar related information is also to be protected by the present disclosure, and details of what information is included will not be repeated here.

The related information of failure in the MCG side includes at least one of: a failure type of the MCG; a measurement result configured by the MN; Random Access Channel, RACH, related information of the MCG; cell ID of the Primary Cell, PCell, where a RLF occurs; cell IDs of source PCell and target PCell when the PCell handover failure; time from PCell handover initialization to a failure occurs; time from when a failure of the PCell occurs to when the RLF report is reported; time from when a failure of the PCell occurs to re-entering a connected state; or indication information that the MCG is performing PCell handover. If the related information of the failure in the MCG side in the RLF report includes the indication information that the MCG is performing PCell handover, it indicates that the RLF has occurred in the SCG at this time, and MCG is undergoing PSCell handover processes, and data transmission cannot proceed normally. It should be noted that the related information of the PCell listed above is only a part, and other similar related information is also to be protected by the present disclosure, and details of what information is included will not be repeated here.

In some embodiments, the value of T316 is used for indicating whether the UE is configured with T316, and when T316 is configured, the record format of the value of T316 can be explicitly indicated by bit value, for example, "1" is used for indicating that T316 is configured, or the running time of T316 configured by the network device can also be directly recorded, or the running time of T316 can also be directly recorded, or a second identifier is used for indicating whether the T316 timer has expired, for example, "0" is used for indicating that T316 is not configured.

In some embodiments, the recording form of the sequence of RLFs occurred in MCG and SCG may be indicated by the first identifier, for example, 1 bit explicitly indicates that the RLF occurring in the MCG is earlier than the RLF occurring in the SCG, and implicitly indicates that the RLF occurring in the SCG is earlier than the RLF occurring in the MCG, or 1 bit implicitly indicates that the RLF occurring in the MCG is earlier than the RLF occurring in the SCG, and explicitly indicates that the RLF occurring in the SCG is earlier than the RLF occurring in the MCG; or directly records absolute time or relative time at which the RLF occurs in the MCG, and absolute time or relative time at which the RLF occurs in the SCG; or directly record the time difference, for example, when the difference result is negative, it indicates that RLF occurs first in SCG, and when the difference result is positive, it indicates that RLF occurs first in MCG. Here, the absolute time refers to the moment. For example, the recorded time of the RLF occurred in MCG is 2021/5/3 22:45:03, which means that the time of RLF occurred in MCG is 22:45:03 on May 3, 2021. Relative Time refers to the time with a certain moment as a reference. For example, the time when the UE is turned on is used as the reference time. The recorded time of the RLF occurred in the MCG is 00:30:45, which means that the RLF occurred in the MCG on 30 minutes and 45 seconds after the UE was turned on.

In some embodiments, when the network device receives the RLF report reported by the UE, the network device can know whether the RLF occurs in the MCG or the SCG according to the content included in the report, or whether the RLF occurs first on the MCG or the SCG.

For example, the content in the RLF report includes the failure type of the MCG, the measurement result configured by the MN, the related information of the T316 timer, the DC indication, and the measurement result configured by the SN. Based on this content, the network device can know that the RLF occurred in the MCG, and that the SCG can transmits data normally. At this time, the network device can also determine whether the cause for the RLF is that the T316 timer is not configured or other causes according to the related information of the T316 timer.

For another example, the content in the RLF report includes the failure type of the SCG, the measurement result configured by the SN, the DC indication, and the measurement result configured by the MN. Based on this content, the network device can know that the RLF occurred in the SCG, and the MCG can transmit data normally.

For another example, the content in the RLF report includes DC indication, the related information of T316 timer, time indication information, the related information of a failure in the MCG and the related information of a failure in the SCG. According to the content, the network device can know that RLFs have occurred in both the MCG and the SCG, and the RLF occurs first in the MCG or the SCG.

In some embodiments, when the UE determines that the RLFs occur in both the MCG and the SCG, the RLF report may further include time indication information, which is used for indicating whether the UE first detects that the RLF occurs in the MCG or the SCG. At this time, the network device can determine according to the time indication information whether the SCG has been suspended by the network device or whether the RLF occurs in the SCG after transmitting the MCG failure information message; or the network device can determine according to the time indication information whether the MCG has been suspended by the network device or whether the RLF occurs in the MCG after transmitting the SCG failure information message.

It is assumed that the time indication information includes first time indication information and second time indication information. For example, the first time indication information is used for indicating that the UE first detects that the RLF occurs in the MCG, and then detects that the RFL occurs in the SCG; and the second time indication information indicates that the RLF occurs first in the SCG, and the network device may determine that the SCG has been suspended by the network device before the RLF occurs in the MCG according to the first time indication information and the second time indication information.

For another example, the first time indication information is used for indicating that the UE first detects that the RLF occurs in the MCG, and then detects that the RFL also occurs in the SCG, and the second time indication information indicates that the RLF first occurs in the MCG, and the network device can determine based on the first time indication information and the second time indication information that the RLF occurs in the SCG after the SCG transmits the MCG failure information message and before the MCG receives the RRC feedback information transmitted by the network device.

In some embodiments, compared with the content of the RLF report in the prior art, the network devices can identify more specific causes for the RLF occurrence in the MCG and/or the SCG based on the RLF report in the present disclosure, to more accurately determine the cause of failure and determining corresponding optimization scheme.

Step 203: the UE transmits the RLF report to the network device when the preset condition is met.

In some embodiments of the present disclosure, when the UE detects that the RLF occurs in the MCG, the SCG can transmit the data normally, and the T316 has been configured, the UE can transmits the MCG failure indication information to the network device through the SCG; and the network device can change the radio resource configuration of the MN to bases on the MCG failure indication information to enable the MCG to quickly recover connections, and then transmits the RRC configuration information to the UE; and the UE updates according to the RRC configuration information. At this time, if the MCG is successfully restored, the UE transmits a successful recovery message to the network device and delete the recorded RLF report. If the recovery of the MCG fails, the UE stores the RLF report, and reports the RLF report to the network device when a preset condition is met. If the UE detects that the T316 is not configured, the UE stores the RLF report, and reports the RLF report to the network device when the preset condition is met.

Here, the preset condition is, for example, that the UE receives a request message transmitted by the network device for requesting the UE to report the RLF report.

In some embodiments, when the MCG recovery fails, or T316 is not configured, the UE needs to transmit a re-establishment request to the network device when saving the RLF report; or the UE transmits a connection establishment request when the re-establishment fails within a preset time period; or the UE transmits a connection restoration request to the network device when the connection is restored, or the UE transmits a connection reconfiguration request to the network device when the connection is reconfigured. And, when the re-establishment is successful, or the connection is successfully established, or the connection is restored successfully, or the connection is configured successful, an uplink complete message will be transmitted to the network device, and the uplink complete message carries an available indication for storing the RLF report. After receiving the available indication, the network device determines whether the UE is required to report the RLF report. When the network device determines that the UE is required to report the RLF report, the network device will transmit a request message requesting the RLF report to the UE.

In some embodiments, when the UE detects that the RLF occurs in the SCG and the MCG can transmit data normally, the UE transmits the SCG failure indication information to the network device through the MCG, and the network device can change the RRC configuration information of the SN according to the SCG failure indication information, and transmits the RRC configuration information to the UE. The UE can handover the PSCell or update the configuration information for fast connection recovery according to the RRC configuration information. If the recovery fails, the UE transmits the SCG failure indication information through the MCG until the connection is restored, or the network device suspends or releases the SCG, or the RLF also occurs in MCG.

Step 204: the network device transmits the RLF report to the MN and/or the SN.

In some embodiments of the present disclosure, when the network device receives the RLF report transmitted by the UE, the network device can transmit the RLF report to the source MN and the source SN according to the cell ID of the source PCell and the cell ID of the source PSCell, where the source MN includes the MCG, the source SN includes SCG; or transmit the RLF report to the source MN according to the cell ID of the source PCell; or transmit the RLF report and the first indication information for instructing the source MN to transmit the RLF report to the source SN according to the cell ID of the source PSCell, and the source MN and the source SN can know the cause of RLF and optimize the MCG and the SCG separately.

In order to better understand the embodiments of the present disclosure, the information processing method provided by the present disclosure will be explained below in conjunction with some embodiments.

Embodiment 1: When the RLF occurs in MCG, SCG is in suspending state.

Step 1: the network configures a DC for the UE.

Step 2: the RLF occurs in the SCG, and the SCG transmits an SCG Failure Information message to the network through the MCG.

Step 3: the RLF occurs in the MCG when the UE has not received the RRC feedback message transmitted by the network device.

Step 4: The UE stores the RLF report, and the RLF report records: the time indication information used for indicating that the RLF occurred in the MCG and the RLF occurred in the SCG, related information of a failure in the MCG, related information of a failure in the SCG, related information of T316 timer, and DC indication information.

The related information of a failure in the MCG includes the measurement result configured by the SN. Here, the measurement result configured by the SN can be understood as recording the measurement result measured by the UE according to the measurement configuration configured by the SN when the RLF occurs in the MCG.

The related information of a failure in the SCG includes the measurement result configured by the MN. Here, the measurement result configured by the MN can be understood as recording the measurement result measured by the UE according to the measurement configuration configured by the MN when the RLF occurs in the SCG.

Step 5: the UE initiates a reestablishment process.

Step 6: the UE reports an RLF report available instruction in the uplink completion message after the UE enters the connection state.

Step 7: the network transmits a UE information request message to request the UE to report the RLF report.

Step 8: the UE reports the RLF report in the UE information request response message.

Step 9: the network analyzes the causes for the RLF and the failure of fast MCG failure recovery. It is found that the failure of fast MCG failure recovery is caused by the suspension of the SCG, and the network performs corresponding optimization.

Embodiment 2: When the RLF occurs in MCG, the UE is not configured with T316.

Step 1: the network configures a DC for the UE.

Step 2: the RLF occurs in MCG.

Step 3: The UE records the RLF report, and the RLF report records the following information: 1 bit used for indicating that T316 is not configured, and the related information of failure in the MCG.

The related information of failure in the MCG includes the measurement result configured by the SN. Here, the measurement result configured by the MN can be understood as recording the measurement result measured by the UE according to the measurement configuration configured by the MN when the RLF occurs in the SCG.

Step 4: the UE initiates a re-establishment process.

Step 5: the UE reports an RLF report available instruction in the uplink completion message after the UE enters the connection state.

Step 6: the network transmits a UE information request message to request the UE to report the RLF report.

Step 7: the UE reports the RLF report in the UE information request response message.

Step 8: the network analyzes the causes for the RLF and the failure of fast MCG failure recovery. It is found that the failure of fast MCG failure recovery is caused by not configuring T316, and the network performs corresponding optimization.

Embodiment 3: the RLF occurs in the SCG when T316 is running, after the RLF occurs in the MCG.

Step 1: the network configures a DC for the UE.

Step 2: the RLF occurs in the MCG, and the MCG transmits an MCG Failure Information message to the network through the SCG.

Step 3: the RLF occurs in the SCG when the UE has not received the RRC feedback message transmitted by the network device.

Step 4: the UE records the RLF report, and the RLF report records: the time indication information used for indicating that the RLF occurred in the MCG and the RLF occurred in the SCG, related information of a failure in the MCG, related information of a failure in the SCG, related information of T316 timer, and DC indication information.

The related information of a failure in the MCG includes the measurement result configured by the SN. Here, the measurement result configured by the SN can be understood as recording the measurement result measured by the UE according to the measurement configuration configured by the SN when the RLF occurs in the MCG.

The related information of a failure in the SCG includes the measurement result configured by the MN. Here, the measurement result configured by the MN can be understood as recording the measurement result measured by the UE according to the measurement configuration configured by the MN when the RLF occurs in the SCG.

Step 5: the UE initiates a reestablishment process.

Step 6: the UE reports an RLF report available instruction in the uplink completion message after the UE enters the connection state.

Step 7: the network transmits a UE information request message to request the UE to report the RLF report.

Step 8: the UE reports the RLF report in the UE information request response message.

Step 9: the network analyzes the causes for the RLF and the failure of fast MCG failure recovery. It is found that the fast MCG failure recovery failure is caused by SCG failure when T316 is running, and the network performs corresponding optimization.

Embodiment 4: the RLF occurs in the MCG and the T316 expired.

Step 1: the network configures a DC for the UE.

Step 2: the RLF occurs in the MCG, and the MCG transmits an MCG Failure Information message to the network through the SCG.

Step 3: T316 expired when the UE has not received the RRC feedback message transmitted by the network device.

Step 4: the UE records the RLF report, and the RLF report records: the value of T316, and the related information of a failure in the MCG.

The related information of a failure in the MCG includes the measurement result configured by the SN. Here, the measurement result configured by the SN can be understood as recording the measurement result measured by the UE according to the measurement configuration configured by the SN when the RLF occurs in the MCG.

Step 5: the UE initiates a reestablishment process.

Step 6: the UE report an RLF report available instruction in the uplink completion message after the UE enters the connection state.

Step 7: the network transmits a UE information request message to request the UE to report the RLF report.

Step 8: the UE reports the RLF report in the UE information request response message.

Step 9: T the network analyzes the causes for the RLF and the failure of fast MCG failure recovery. It is found that the failure of the fast MCG failure recovery is caused by the T316 expired, and the network performs corresponding optimization.

Embodiment 5: the RLF occurs in the SN side, and the RLF report of the PSCell is recorded.

When the RLF occurs in the SN side and the RLF report of the PSCell is recorded, the SCG Failure Information is transmitted by the MCG side, it is found that the RLF also occurs in the MCG side; or when the SCG Failure Information message is transmitted and the RRC feedback message transmitted by the network has not been received, it is found that the RLF also occurs in the MCG side. At this point, it is possible to record time indication information used for indicating that the RLF occurs in the MCG and the RLF occurs in the SCG, related information of a failure in the MCG, related information of a failure in the SCG, related information of T316 timer, and DC indication information.

The related information of a failure in the MCG includes the measurement result configured by the SN. Here, the measurement result configured by the SN can be understood as recording the measurement result measured by the UE according to the measurement configuration configured by the SN when the RLF occurs in the MCG.

The related information of a failure in the SCG includes the measurement result configured by the MN. Here, the measurement result configured by the MN can be understood as recording the measurement result measured by the UE according to the measurement configuration configured by the MN when the RLF occurs in the SCG.

Figure 3:
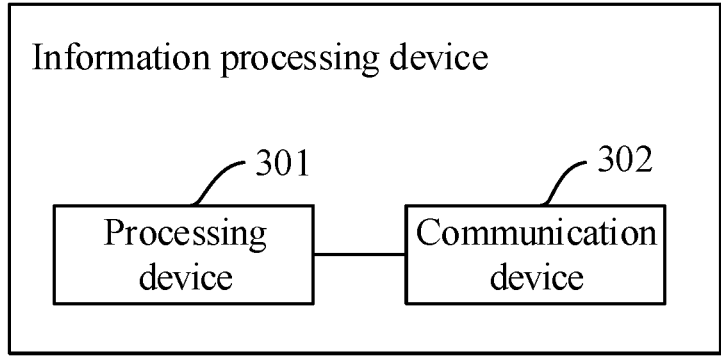
FIG. 3 is a schematic structural diagram of an information processing apparatus applied in a terminal provided by an embodiment of the present disclosure.

An embodiment of the present disclosure provides an information processing device, the information processing device is applied to a UE, and the information processing device can realize the function corresponding to the information processing method of the aforementioned UE. The information processing device may be a hardware structure, a software module, or a hardware structure plus a software module. The information processing device may be implemented by a chip system, and the chip system may consist of chips, or may include chips and other discrete devices. Referring to FIG. 3, the information processing device includes a processing device 301 and a communication device 302, where:

the processing device 301 is configured to store a Radio Link Failure, RLF, report in a case that an RLF is detected in a Master Cell Group, MCG, and/or a Secondary Cell Group, SCG, where the RLF report includes: first information used for indicating that the RLF occurs in the MCG; and/or, second information used for indicating that the RLF occurs in the SCG;

the communication device 302 is configured to report the RLF report to the network device when the preset condition is met.

In some embodiments, in a case that the RLF is detected in the MCG and the SCG transmits data normally, the first information includes at least one of following:

a related information of a failure in the MCG;

a related information of T316 timer;

a Dual Connectivity, DC, indication; or a measurement result configured by a Secondary Node, SN.

In some embodiments, in a case that the RLF is detected in the SCG and the MCG transmits data normally, the second information includes at least one of following:

a related information of a failure in the SCG;

a DC indication; or a measurement result configured by a Master Node, MN.

In some embodiments, in a case that the RLFs are detected in both the MCG and the SCG, the first information includes at least one of: a DC indication information, a related information of T316 timer, a RLF report related a failure in the MCG, or a related information of a failure in the MCG;

the second information includes at least one of: a RLF report related a failure in the SCG, or a related information of a failure in the SCG;

the RLF report further includes: a time indication information used for indicating a sequence of the RLFs occur in the MCG and the SCG.

In some embodiments, the related information of a failure in the SCG includes at least one of following:

a failure type of the SCG;

a measurement result configured by the SN;

a Random Access Channel, RACH, related information of the SCG;

cell IDs of the Primary and Secondary Cell, PSCell, where the RLF occurs;

cell IDs of source PSCell and target PSCell in response to the PSCell handover failure;

a time from a moment of PSCell handover initialization/handover implementation to a moment of a failure occurring;

a time from a moment of a failure of the PSCell occurring to a moment of the RLF report being reported;

a time from a moment of a failure of the PSCell occurring to a moment of re-entering a connected state; or an indication information that the SCG is performing PSCell handover or PSCell addition.

In some embodiments, the related information of a failure in the MCG includes at least one of following:

a failure type of the MCG;

a measurement result configured by the MN;

a Random Access Channel, RACH, related information of the MCG;

a cell ID of the Primary Cell, PCell, where a RLF occurs;

cell IDs of source PCell and target PCell in response to the PCell handover failure;

a time from a moment of PCell handover initialization/handover implementation to a moment of a failure occurring;

a time from a moment of a failure of the PCell occurring to a moment of the RLF report being reported;

a time from a moment of a failure of the PCell occurring to a moment of re-entering a connected state; or an indication information that the MCG is performing PCell handover.

In some embodiments, the time indication information includes:

a first identifier, used for indicating that the RLF occurring in the MCG is earlier than the RLF occurring in the SCG or indicating that the RLF occurring in the SCG is earlier than the RLF occurring in the MCG; or, a first time difference; or, an absolute time or a relative time at which the RLF occurs in the MCG, and an absolute time or a relative time at which the RLF occurs in the SCG.

In some embodiments, the related information of T316 timer includes at least one of following:

a bit value explicitly indicating whether the T316 timer is configured;

a configured running duration of the T316 timer;

an already-running time of the T316 timer; or a second identifier explicitly indicating whether the T316 timer has expired.

Figure 4:
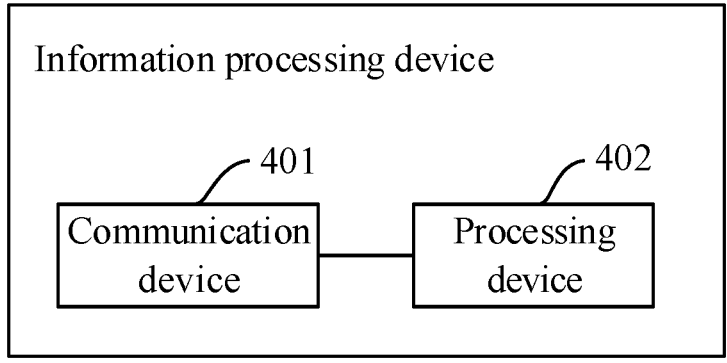
FIG. 4 is a schematic structural diagram of an information processing apparatus applied in network device provided by an embodiment of the present disclosure.

An embodiment of the present disclosure provides an information processing device, the information processing device is applied to a network device, and the information processing device can realize the function corresponding to the information processing method of the aforementioned network device. The information processing device may be a hardware structure, a software module, or a hardware structure plus a software module. The information processing device may be implemented by a chip system, and the chip system may consist of chips, or may include chips and other discrete devices. Referring to FIG. 4, the information processing device includes a communication device 401 and a processing device 402; where:

the communication device 401 is configured to receive an RLF report transmitted by a UE, where the RLF report includes: a first information used for indicating that a RLF occurs in an MCG; and/or a second information used for indicating that a RLF occurs in a SCG; and the processing device 402 is configured to perform a network optimization according to the RLF report.

In some embodiments, the communication device 401 is configured to:

transmit the RLF report to the source MN and the source SN according to the cell ID of the source PCell and the cell ID of the source PSCell, where the source MN includes the MCG, and the source SN includes the SCG; or, transmit the RLF report to the source MN according to the cell ID of the source PCell or transmit the RLF report and first indication information to the source MN according to the cell ID of the source PCell, where the first indication information is sued to indicate the source MN to transmit the RLF report to the source SN according to cell IDs of source PSCell.

All related content of the steps involved in the aforementioned embodiments of the information processing method can be referred to the functional description of the functional modules corresponding to the information processing device in the embodiments of the present disclosure, and will not be repeated here.

The division of devices in the embodiments of the present disclosure is schematic, and is only a logical function division. In actual implementation, there may be other division methods. In addition, each functional device in each embodiment of the present disclosure can be integrated into a processor, it can also be physically present separately, or two or more devices can be integrated into one device. The above-mentioned integrated devices can be implemented in the form of hardware or in the form of software function devices.

Figure 5:
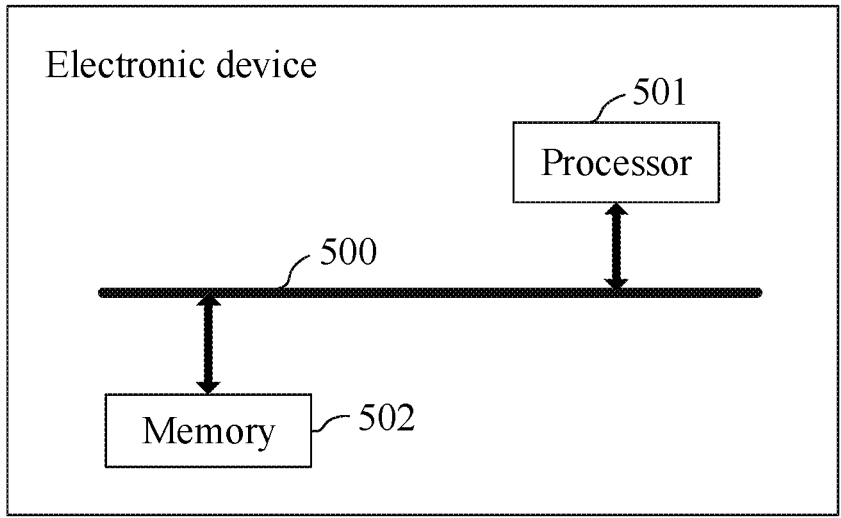
FIG. 5 is a schematic structural diagram of an information processing apparatus provided by an embodiment of the present disclosure.

An embodiment of the present disclosure provides an information processing device. Please refer to FIG. 5, the electronic device includes at least one processor 501, and a memory 502 connected with the at least one processor. The embodiment of the present disclosure does not limit the specific connection medium between the processor 501 and the memory 502. FIG. 5 shows an example of a bus 500 connection between the processor 501 and the memory 502. The bus 500 is represented by a thick line in FIG. 5, the connection methods between other components are only illustrative and not limited here. The bus 500 can be divided into an address bus, a data bus, a control bus, etc. For ease of representation, only one thick line is used in FIG. 5, but it does not mean that there is only one bus or one type of bus.

In some embodiments of the present disclosure, the memory 502 stores instructions executable by at least one processor 501, and the at least one processor 501 can execute the steps included in the aforementioned information processing method by executing the instructions stored in the memory 502.

Here, the processor 501 is the control center of the electronic device, and various interfaces and lines can be configured to connect various parts of the entire electronic device. By running or executing instructions stored in the memory 502 and calling data stored in the memory 502, the electronic device various functions and processing data, to monitor the electronic equipment as a whole. In some embodiments, the processor 501 may include one or more processing units, and the processor 501 may integrate an application processor and a modem processor, where the application processor mainly processes operating systems and application programs, and the modem processor mainly deals with radio communication. It can be understood that the foregoing modem processor may not be integrated into the processor 501. In some embodiments, the processor 501 and the memory 502 can be integrated into a same chip, and in some embodiments, they can also be implemented on independent chips.

The processor 501 may be a general-purpose processor, such as a central processing unit (CPU), a digital signal processor, an application-specific integrated circuit, a field programmable gate array or other programmable logic device, a discrete gate or transistor logic device, or a discrete hardware component. The processor can realize or execute the various methods, steps and logic block diagrams disclosed in the embodiments of the present disclosure. A general-purpose processor may be a microprocessor or any conventional processor or the like. The steps of the information processing method disclosed in the embodiments of the present disclosure may be directly executed by a hardware processor, or executed by a combination of hardware and software modules in the processor.

The memory 502, as a non-volatile computer-readable storage medium, can be configured to store non-volatile software programs, non-volatile computer-executable programs and modules. The memory 502 may include at least one type of storage medium, such as flash memory, hard disk, multimedia card, card memory, Random Access Memory (RAM), Static Random Access Memory (SRAM), Programmable Read Only Memory (PROM), Read Only Memory (ROM), Electrically Erasable Programmable Read-Only Memory (EEPROM), Magnetic Memory, Disk, CD, etc. Memory 502 is any other medium that can be configured to carry or store desired program code in the form of instructions or data structures and can be accessed by a computer, but is not limited to this. The memory 502 in the embodiments of the present disclosure may also be a circuit or any other device for implementing a storage function, and is configured for storing program instructions and/or data.

By designing and programming the processor 501, the code corresponding to the receiving or transmitting method of the multimedia broadcast multicast service (MBMS) introduced in the foregoing embodiments can be solidified into the chip, and the chip can execute the foregoing information processing method during operation. How to design and program the processor 501 is well known, and will not be repeated here.

The information processing device can be applied on the UE for information processing, including:

a memory, configured to store program instructions;

a processor, configured to invoke the program instructions stored in the memory, and implement followings according to obtained program instructions:

storing a Radio Link Failure, RLF, report in a case that an RLF is detected in a Master Cell Group, MCG, and/or a Secondary Cell Group, SCG, where the RLF report includes: first information used for indicating that the RLF occurs in the MCG; and/or, second information used for indicating that the RLF occurs in the SCG;

reporting the RLF report to a network device in a case that a preset condition is met.

In some embodiments, in a case that the RLF is detected in the MCG and the SCG transmits data normally, the first information includes at least one of following:

a related information of a failure in the MCG;

a related information of T316 timer;

a Dual Connectivity, DC, indication; or a measurement result configured by a Secondary Node, SN.

In some embodiments, in a case that the RLF is detected in the SCG and the MCG transmits data normally, the second information includes at least one of following:

a related information of a failure in the SCG;

a DC indication; or a measurement result configured by a Master Node, MN.

In some embodiments, in a case that the RLFs are detected in both the MCG and the SCG, the first information includes at least one or more of: a DC indication information, a related information of T316 timer, a RLF report related a failure in the MCG, or a related information of a failure in the MCG;

the second information includes at least one or more of: a RLF report related a failure in the SCG, or a related information of a failure in the SCG;

the RLF report further includes: a time indication information used for indicating a sequence of the RLFs occur in the MCG and the SCG.

In some embodiments, the related information of a failure in the SCG includes at least one of following:

a failure type of the SCG;

a measurement result configured by the SN;

a Random Access Channel, RACH, related information of the SCG;

cell IDs of the Primary and Secondary Cell, PSCell, where the RLF occurs;

cell IDs of source PSCell and target PSCell in response to the PSCell handover failure;

a time from a moment of PSCell handover initialization/handover implementation to a moment of a failure occurring;

a time from a moment of a failure of the PSCell occurring to a moment of the RLF report being reported;

a time from a moment of a failure of the PSCell occurring to a moment of re-entering a connected state; or an indication information that the SCG is performing PSCell handover or PSCell addition.

In some embodiments, the related information of a failure in the MCG includes at least one of following:

a failure type of the MCG;

a measurement result configured by the MN;

a Random Access Channel, RACH, related information of the MCG;

a cell ID of the Primary Cell, PCell, where a RLF occurs;

cell IDs of source PCell and target PCell in response to the PCell handover failure;

a time from a moment of PCell handover initialization/handover implementation to a moment of a failure occurring;

a time from a moment of a failure of the PCell occurring to a moment of the RLF report being reported;

a time from a moment of a failure of the PCell occurring to a moment of re-entering a connected state; or an indication information that the MCG is performing PCell handover.

In some embodiments, the time indication information includes:

a first identifier, used for indicating that the RLF occurring in MCG is earlier than the RLF occurring in SCG or indicating that the RLF occurring in SCG is earlier than the RLF occurring in MCG; or, a first time difference; or, an absolute time or a relative time at which the RLF occurs in the MCG, and an absolute time or a relative time at which the RLF occurs in the SCG.

In some embodiments, the related information of T316 timer includes at least one or more of following:

a bit value explicitly indicating whether the T316 timer is configured;

a configured running duration of the T316 timer;

an already-running time of the T316 timer; or a second identifier explicitly indicating whether the T316 timer has expired.

The information processing device can be applied on the network device for information processing, including:

a memory, configured to store program instructions;

a processor, configured to invoke the program instructions stored in the memory, and implement followings according to obtained program instructions:

receiving an RLF report transmitted by a UE, where the RLF report includes: first information used for indicating that a RLF occurs in an MCG; and/or second information used for indicating that a RLF occurs in a SCG;

performing network optimization according to the RLF report.

In some embodiments, the performing network optimization according to the RLF report includes:

transmitting the RLF report to a source MN and a source SN according to a source PCell ID and a source PSCell ID, where the source MN includes the MCG, and the source SN includes the SCG; or, transmitting the RLF report to a source MN according to a source PCell ID, or transmitting the RLF report and first indication information to a source MN according to a source PCell ID, where the first indication information is used for indicating the source MN to transmit the RLF report to the source SN according to cell IDs of source PSCell.

An embodiment of the present disclosure also provides a computer-readable storage medium, the computer-readable storage medium stores computer instructions, and when the computer instructions are executed on the computer, the computer is configured to execute the steps in the aforementioned information processing method.

In some embodiments, the information processing method provided in the present disclosure can also be implemented in the form of a program product, which includes program code, and when the program product is executed on an electronic device, the program code is used to make the detection device executes the steps in the information processing method according to various embodiments of the present disclosure described above in the description.

The embodiments of the present disclosure may be provided as a method, a system, or a computer program product. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage medium (including but not limited to a disk storage, an optical storage, and the like) having computer-usable program code embodied therein.

The present disclosure is described with reference to flowchart illustrations and/or block diagrams of methods, apparatus (systems), and computer program products according to embodiments of the present disclosure. It will be understood that each flow and/or block in the flowchart illustrations and/or block diagrams, and combinations of flows and/or blocks in the flowchart illustrations and/or block diagrams, can be implemented by computer program instructions. These computer program instructions may be provided to the processor of a general purpose computer, a special purpose computer, an embedded processor or other programmable data processing device to produce a machine, and the instructions executed by the processor of the computer or other programmable data processing device produce devices for implementing the functions specified in a flow or flow of a flowchart and/or a block or blocks of a block diagram.

These computer program instructions may also be stored in a computer-readable memory for directing a computer or other programmable data processing apparatus to function in a particular manner, and the instructions stored in the computer-readable memory result in an article of manufacture including instruction devices, the instructions device implements the functions specified in one or more flows of the flowchart and/or one or more blocks of the block diagrams.

These computer program instructions can also be loaded on a computer or other programmable data processing device to cause a series of operational steps to be performed on the computer or other programmable device to produce a computer-implemented process, and the instructions performed on the computer or other programmable device provide steps for implementing the functions specified in the one or more flows of the flowcharts and/or one or more blocks of the block diagrams.

What is claimed is:

1. A radio link failure report information processing method, applied to a User Equipment, UE, in a multi-connection scenario, the information processing method comprises:

storing a Radio Link Failure, RLF, report in a case that an RLF is detected, wherein the RLF report comprises: a first information used for indicating that the RLF occurs in a Master Cell Group, MCG; and/or, a second information used for indicating that the RLF occurs in a Secondary Cell Group, SCG;

reporting the RLF report to a network device in a case that a preset condition is met;

wherein in a case that the RLFs are detected in both the MCG and the SCG, the RLF report further comprises: a time indication information used for indicating a sequence of the RLFs occur in the MCG and the SCG;

wherein the time indication information comprises:

a first identifier used for indicating that the RLF occurring in the MCG is earlier than the RLF occurring in the SCG or indicating that the RLF occurring in the SCG is earlier than the RLF occurring in the MCG; or a first time difference; or an absolute time or a relative time at which the RLF occurs in the MCG, and an absolute time or a relative time at which the RLF occurs in the SCG.

2. The method according to claim 1, wherein in a case that the RLF is detected in the MCG and the SCG transmits data normally, the first information comprises at least one of following:

a related information of a failure in the MCG;

a related information of T316 timer;

a Dual Connectivity, DC, indication; or a measurement result configured by a Secondary Node, SN.

3. The method according to claim 2, wherein the related information of a failure in the MCG comprises at least one of following:

a failure type of the MCG;

a measurement result configured by the MN;

a Random Access Channel, RACH, related information of the MCG;

a cell ID of the Primary Cell, PCell, where a RLF occurs;

cell IDs of source PCell and target PCell in response to the PCell handover failure;

a time from a moment of PCell handover initialization/ handover implementation to a moment of a failure occurring;

a time from a moment of a failure of the PCell occurring to a moment of the RLF report being reported;

a time from a moment of a failure of the PCell occurring to a moment of re-entering a connected state; or an indication information that the MCG is performing PCell handover.

4. The method according to claim 2, wherein the related information of T316 timer comprises at least one or more of following:

a bit value explicitly indicating whether the T316 timer is configured;

a configured running duration of the T316 timer;

an already-running time of the T316 timer; or a second identifier explicitly indicating whether the T316 timer has expired.

5. The method according to claim 1, wherein in a case that the RLF is detected in the SCG and the MCG transmits data normally, the second information comprises at least one of following:

a related information of a failure in the SCG;

a Dual Connectivity, DC, indication; or a measurement result configured by a Master Node, MN.

6. The method according to claim 5, wherein the related information of a failure in the SCG comprises at least one of following:

a failure type of the SCG;

a measurement result configured by the SN;

a Random Access Channel, RACH, related information of the SCG;

cell IDs of the Primary and Secondary Cell, PSCell, where the RLF occurs;

cell IDs of source PSCell and target PSCell in response to the PSCell handover failure;

a time from a moment of PSCell handover initialization/ handover implementation to a moment of failure occurring;

a time from a moment of a failure of the PSCell occurring to a moment of the RLF report being reported;

a time from a moment of a failure of the PSCell occurring to a moment of re-entering a connected state; or an indication information that the SCG is performing PSCell handover or PSCell addition.

7. The method according to claim 1, wherein, in the case that the RLFs are detected in both the MCG and the SCG, the first information comprises at least one of: a Dual Connectivity, DC, indication information, a related information of T316 timer, a RLF report related a failure in the MCG, or a related information of a failure in the MCG;

the second information comprises at least one of: a RLF report related a failure in the SCG, or a related information of a failure in the SCG.

8. A non-transitory computer-readable storage medium storing a computer program thereon, wherein the computer program comprises program instructions, when program instructions are executed by a computer, the computer implements the method of any one of claim 1.

9. A radio link failure report information processing method, applied to a network device, the information processing method comprises:

receiving a Radio Link Failure, RLF report transmitted by a User Equipment, UE, wherein the RLF report comprises: a first information used for indicating that a RLF occurs in a Master Cell Group, MCG, MCG; and/or a second information used for indicating that a RLF occurs in a Secondary Cell Group, SCG; and performing a network optimization according to the RLF report;

wherein in a case that the RLFs are detected in both the MCG and the SCG, the RLF report further comprises: a time indication information used for indicating a sequence of the RLFs occur in the MCG and the SCG;

wherein the time indication information comprises:

a first identifier used for indicating that the RLF occurring in the MCG is earlier than the RLF occurring in the SCG or indicating that the RLF occurring in the SCG is earlier than the RLF occurring in the MCG; or a first time difference; or an absolute time or a relative time at which the RLF occurs in the MCG, and an absolute time or a relative time at which the RLF occurs in the SCG.

10. The method according to claim 9, wherein the performing the network optimization according to the RLF report, comprises:

transmitting the RLF report to a source MN and a source SN according to a source PCell ID and a source PSCell ID, wherein the source MN comprises the MCG, and the source SN comprises the SCG; or, transmitting the RLF report to a source MN according to a source Pcell ID, or transmitting the RLF report and a first indication information to a source MN according to a source Pcell ID, wherein the first indication information is used for indicating the source MN to transmit the RLF report to the source SN according to source PSCell IDs.

11. A radio link failure report information processing device, comprising:

a memory configured to store program instructions;

a processor configured to invoke the program instructions stored in the memory, and implement the method of claim 9 according to obtained program instructions.

12. A radio link failure report information processing device, comprising:

a memory configured to store program instructions;

a processor configured to invoke the program instructions stored in the memory, and implement followings according to obtained program instructions:

storing a Radio Link Failure, RLF, report in a case that an RLF is detected, wherein the RLF report comprises: a first information used for indicating that the RLF occurs in a Master Cell Group, MCG; and/or, a second information used for indicating that the RLF occurs in a Secondary Cell Group, SCG;

reporting the RLF report to a network device in a case that a preset condition is met;

wherein in a case that the RLFs are detected in both the MCG and the SCG, the RLF report further comprises:

a time indication information used for indicating a sequence of the RLFs occur in the MCG and the SCG;

wherein the time indication information comprises:

a first identifier used for indicating that the RLF occurring in the MCG is earlier than the RLF occurring in the SCG or indicating that the RLF occurring in the SCG is earlier than the RLF occurring in the MCG; or a first time difference; or an absolute time or a relative time at which the RLF occurs in the MCG, and an absolute time or a relative time at which the RLF occurs in the SCG.

13. The device according to claim 12, wherein, in a case that the RLF is detected in the MCG and the SCG transmits data normally, the first information comprises at least one of following:

a related information of a failure in the MCG;

a related information of T316 timer;

a Dual Connectivity, DC, indication; or a measurement result configured by a Secondary Node, SN.

14. The device according to claim 13, wherein the related information of a failure in the MCG comprises at least one of following:

a failure type of the MCG;

a measurement result configured by the MN;

a Random Access Channel, RACH, related information of the MCG;

a cell ID of the Primary Cell, PCell, where a RLF occurs;

cell IDs of source PCell and target PCell in response to the PCell handover failure;

a time from a moment of PCell handover initialization/ handover implementation to a moment of a failure occurring;

a time from a moment of a failure of the PCell occurring to a moment of the RLF report being reported;

a time from a moment of a failure of the PCell occurring to a moment of re-entering a connected state; or an indication information that the MCG is performing PCell handover.

15. The device according to claim 13, wherein the related information of T316 timer comprises at least one or more of following:

a bit value explicitly indicating whether the T316 timer is configured;

a configured running duration of the T316 timer;

an already-running time of the T316 timer; or a second identifier explicitly indicating whether the T316 timer has expired.

16. The device according to claim 12, wherein, in a case that the RLF is detected in the SCG and the MCG transmits data normally, the second information comprises at least one of following:

a related information of a failure in the SCG;

a Dual Connectivity, DC, indication; or a measurement result configured by a Master Node, MN.

17. The device according to claim 16, wherein the related information of a failure in the SCG comprises at least one of following:

a failure type of the SCG;

a measurement result configured by the SN;

a Random Access Channel, RACH, related information of the SCG;

cell IDs of the Primary and Secondary Cell, PSCell, where the RLF occurs;

cell IDs of source PSCell and target PSCell in response to the PSCell handover failure;

a time from a moment of PSCell handover initialization/ handover implementation to a moment of a failure occurring;

a time from a moment of a failure of the PSCell occurring to a moment of the RLF report being reported;

a time from a moment of a failure of the PSCell occurring to a time of re-entering a connected state; or an indication information that the SCG is performing PSCell handover or PSCell addition.

18. The device according to claim 12, wherein, in the case that the RLFs are detected in both the MCG and the SCG, the first information comprises at least one of: a DC indication information, a related information of T316 timer, a RLF report related a failure in the MCG, or a related information of a failure in the MCG;

the second information comprises at least one of: a RLF report related a failure in the SCG, or related information of a failure in the SCG.

* * * * *